United States Patent
Muhanna

(10) Patent No.: US 8,495,491 B2
(45) Date of Patent: Jul. 23, 2013

(54) LOCALE AND OPERATING PLATFORM INDEPENDENT FONT SELECTION

(75) Inventor: Emad Muhanna, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 2165 days.

(21) Appl. No.: 10/907,898

(22) Filed: Apr. 20, 2005

(65) Prior Publication Data

US 2006/0242577 A1 Oct. 26, 2006

(51) Int. Cl.
*G06F 17/00* (2006.01)

(52) U.S. Cl.
USPC ........... 715/269; 715/200; 715/234; 715/264; 715/255; 715/262; 715/263; 715/703; 345/467; 345/689; 345/471; 345/472.3; 704/2; 704/3; 704/5; 704/7; 704/8; 434/156; 434/157; 434/159

(58) Field of Classification Search
USPC ................. 715/200, 255, 264, 269, 262–263, 715/703; 345/467, 689, 471, 472.3; 704/2–3, 704/5, 7–8; 434/156–157, 159
See application file for complete search history.

(56) References Cited

U.S. PATENT DOCUMENTS

| | | | |
|---|---|---|---|
| 5,689,724 A | 11/1997 | Morgan et al. | 715/205 |
| 6,480,291 B1 | 11/2002 | Daniels et al. | 358/1.11 |
| 6,675,357 B1 * | 1/2004 | Carter et al. | 715/210 |
| 2004/0088657 A1 * | 5/2004 | Brown et al. | 715/269 |
| 2006/0047499 A1 * | 3/2006 | Chen et al. | 704/8 |

* cited by examiner

*Primary Examiner* — Cesar Paula
*Assistant Examiner* — David Faber
(74) *Attorney, Agent, or Firm* — Steven Greenberg, Esq.; Carey, Rodriguez, Greenberg & O'Keefe

(57) ABSTRACT

A method, system and apparatus for locale and operating platform independent font selection. In an operating platform having an operating platform configuration and an associated locale, a locale and operating platform independent font selection method can include parsing a pre-established font properties file to identify whether a desired font referenced in the font properties file supports at least one of the operating platform configuration and the associated locale. Consequently, if it is indicated within the font properties file that the desired font supports either or both of the operating platform configuration and the associated locale, the desired font can be utilized in the operating platform.

13 Claims, 2 Drawing Sheets

LOCALE AND OPERATING PLATFORM INDEPENDENT FONT SELECTION

STATEMENT OF THE TECHNICAL FIELD

The present invention relates to font mapping and more particularly to font selection to support multiple locales and operating systems.

DESCRIPTION OF THE RELATED ART

Fonts refer to the visual appearance of textual characters in a computing environment. Fonts can range from generically applicable serif and non-serif fonts, to specially applicable character sets to accommodate particular visual interface needs such as mathematical equations, quasi-graphical images and characters and icons unique to a particular foreign language. Indeed, the variety of fonts available for use in any one particular computing environment can be substantial and ever expanding as new foreign languages are accommodated within modern operating environments.

Generally, there are two types of fonts—physical fonts and logical fonts. Physical fonts are the actual font libraries which can include, for example, true type or postscript type one fonts. The physical fonts can include Times Roman, Helvetica, and Courier to name a few. Logical fonts, by comparison, are not actual font libraries. Rather, logical fonts are font-type names recognized within a specific platform such as an operating system, virtual machine or software development environment. Once recognized by the environment, the font-type names can be mapped to a physical font already installed in the platform. Exemplary logical fonts include Serif, Sans-Serif, Monospaced, Dialog and DialogInput.

The mapping of logical font types and styles to physical fonts is platform and locale specific. Generally, a font properties file can contain the mapping of logical font to physical font. The font properties file can be consulted when initializing the platform and, based upon the mappings of the font properties file, the platform during initialization can create the mapping of logical fonts to physical fonts for use during the duration of use of the platform. In as much as different locales can exist for the same platform and even for different platform versions, multiple font properties files can be created and deployed individually to accommodate each different locale with a locale specific mapping of logical font to physical font.

Due to the inflexible nature of the basic font properties file, several problems can arise when developing an application for deployment across multiple operating platforms, multiple operating platform versions and multiple locales. First, in many circumstances, a font able to display locale specific text in one operating platform may not be able to display locale specific text in other operating platforms. Second, a font that is capable of displaying the non-Latin text of one locale might not be capable of displaying the non-Latin text of another locale. In both cases, the failure to display locale specific text in a particular operating platform can be due to the absence of perfect developer knowledge of the font rendering capabilities of every conceivable operating platform. The inability of a font to display locale specific text in a particular operating platform also can be due to the inability of runtime logic in the platform to support the selected font.

SUMMARY OF THE INVENTION

The present invention addresses the deficiencies of the art in respect to font mapping for different operating platforms and different locales and provides a novel and non-obvious method, system and apparatus for locale and operating platform independent font selection. In an operating platform having an operating platform configuration and an associated locale, a locale and operating platform independent font selection method can include parsing a pre-established font properties file to identify whether a desired font referenced in the font properties file supports at least one of the operating platform configuration and the associated locale. Consequently, if it is indicated within the font properties file that the desired font supports either or both of the operating platform configuration and the associated locale, the desired font can be utilized in the operating platform.

A computing system which has been configured for locale and operating platform independent font selection can include an operating platform having an operating platform configuration and an associated locale. The system also can include a font properties file including multiple entries. Each of the entries can define a font and at least one of corresponding supported locale and a corresponding supported operating platform configuration. Finally, the system can include a locale and operating platform independent font selection processor.

The locale and operating platform independent font selection processor can be programmed first to parse the font properties file to identify whether a desired font referenced in the font properties file supports at least one of the operating platform configuration and the associated locale. The locale and operating platform independent font selection processor subsequently can utilize the desired font in the operating platform if it is indicated within the font properties file that the desired font supports either or both of the operating platform configuration and the associated locale.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for locale and operating platform independent font selection. In accordance with the present invention, a definition file can be created which can associate a list of fonts known to support the non-Latin characters of a specific locale under different operating platform configurations. Subsequently, the definition file can be loaded and parsed in a particular operating platform for a selected locale such that each of the listed fonts can be tested to determine whether the listed fonts can support the non-Latin text of the particular operating platform for the selected locale. Whenever a font is located which can satisfy the foregoing test, the font can be registered for use in the operating platform.

By trifurcating the process of locale and operating platform independent font selection, the invention allows for different specialists to satisfy the different stages of font selection independently of one another. For instance, the font provider can generate the font properties for a font. Subsequently, a developer having knowledge of font support for different locales and operating platforms can complete a font definition file utilizing the font properties, and an application programming interface (API) for parsing the font definition file. Finally, the application developer need only know what static value in memory to query in order to determine what font to call.

Figure 1:
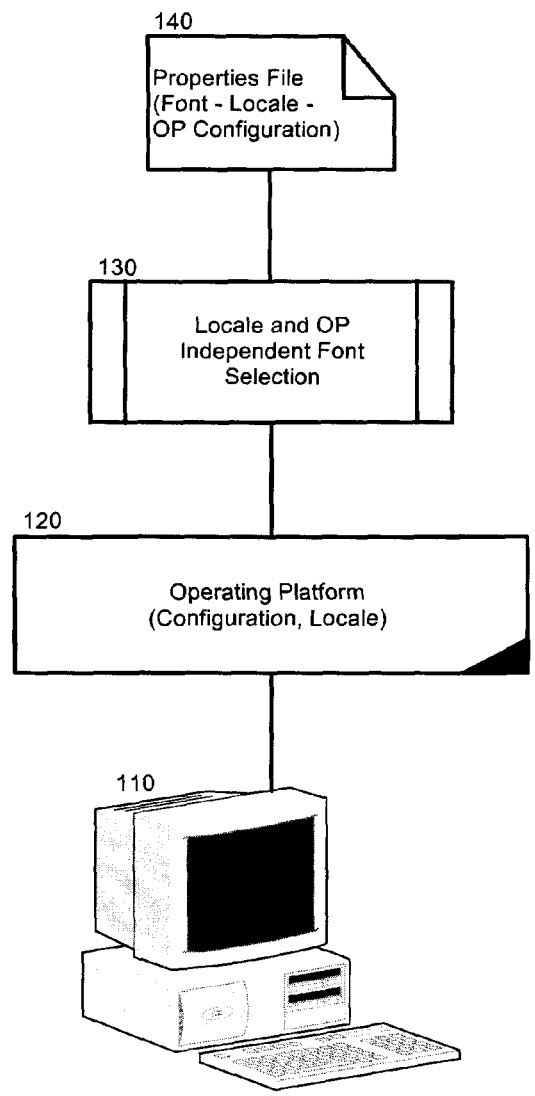
FIG. 1 is a schematic illustration of a computing device configured for locale and operating platform independent font selection; and, FIG. 2 is a flow chart illustrating a process for locale and operating platform independent font selection in the system of FIG. 1.

In more particular illustration of the structure and operation of the present invention, FIG. 1 is a schematic illustration of a computing device 110 configured for locale and operating platform independent font selection. As shown in FIG. 1, a locale and operating platform independent font selection system 130 can interoperate with an operating platform 120 disposed in the computing device 110. The operating platform 120 can have a particular configuration and can be linked to a specified locale. Utilizing a font properties file 140, the locale and operating platform independent font selection system 130 can select a suitable font for use in the operating platform 120 so as to be able to handle the non-Latin text requirements of the operating platform 120.

Figure 2:
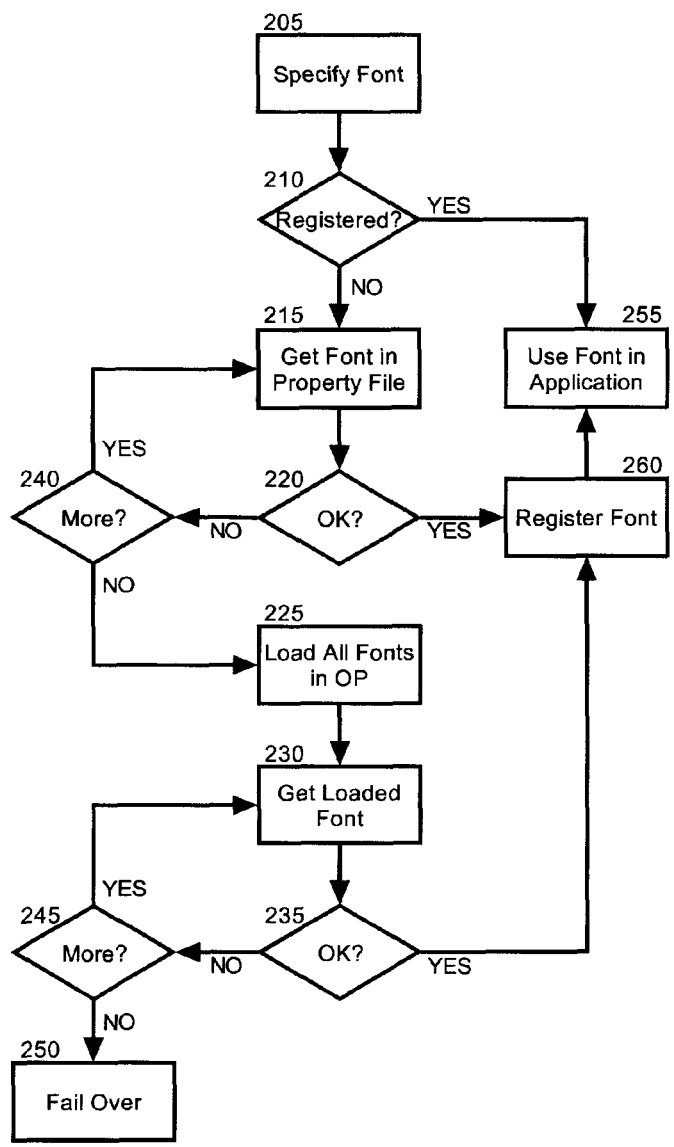

To enable the seamless selection of a suitable font for use in the operating platform to accommodate a particular configuration and locale, a process for locale and operating platform independent font selection can be implemented within the locale and operating platform independent font selection system 130. In further illustration, FIG. 2 is a flow chart illustrating a process for locale and operating platform independent font selection as incorporated in the locale and operating platform independent font selection system 130 of FIG. 1.

Beginning in block 205, a font can be specified for use in an application in the operating platform. In decision block 210, it can be determined whether the specified font already has been registered for use in the operating platform for the required locale. If so, in block 255 the registered font can be utilized. Otherwise, in block 215 an entry for the font can be located in the font properties file. In decision block 220, if the located entry indicates support for the particular operating platform configuration and required locale, in block 260 the font specified in the entry can be registered in the operating platform and the font can be utilized in block 255. Otherwise, the process can continue through decision block 240.

Notably, the entries within the font properties file can include a listing of fonts and corresponding supported operating platform configurations for a particular locale. Notably, the ordering of the entries can indicate a priority of selection for use in a particular operating platform for a specified locale. In one aspect of the invention, a single font properties file can be established for all operating platform configurations. In another aspect of the invention, a font properties file can be established for each operating platform configuration. In both aspects the file can refer to a single locale.

In decision block 240, if it is determined that additional entries remain to be analyzed in the font properties file for the specified font, in block 215 a next entry in the font properties file can be located for the specified font to determine whether the entry indicates support for the configuration of the operating platform and for the preferred locale. Again, in decision block 220, if the located entry indicates support for the particular operating platform configuration and required locale, in block 260 the font specified in the entry can be registered in the operating platform and the font can be utilized in block 255. Otherwise, the process can continue until a suitable entry is located, or until no more entries remain for the font properties file.

In block 225, when all entries have been exhausted for the specified font, in block 225 all fonts in the operating platform can be loaded for analysis. Subsequently, in block 230 the first loaded font can be analyzed to determine in decision block 235 whether the loaded font can support the non-Latin text of the required locale. If so, the font can be registered in block 260 and utilized in block 255. Otherwise, if more fonts can be loaded in decision block 245, the process can repeat in block 230. When no more loaded fonts remain to be analyzed, it can be presumed that no loaded fonts or fonts specified in the font properties file can directly satisfy the particular operating platform configuration and required locale. Accordingly, a fail over process can executed in block 250 which can range from either utilizing a default font, or returning a failure code.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. In an operating platform having an operating platform configuration and an associated locale, a locale and operating platform independent font selection method comprising the steps of:

parsing a pre-established font properties file comprising a listing of fonts and corresponding supported operating platform configurations for a particular locale;

identifying within the font properties file whether a desired font referenced in said font properties file supports at least one of the operating platform configuration and the associated locale; and, utilizing said desired font in the operating platform if it is indicated within said font properties file that said desired font supports said at least one of the operating platform configuration and the associated locale.

2. The method of claim 1, wherein said identifying step comprises the step of identifying within the font properties file whether a desired font referenced in said font properties file supports a display of non-Latin text for the associated locale.

3. The method of claim 1, wherein the identifying step comprises the steps of:
   determining an order of priority for multiple entries in said font properties file for said desired font; and,
   testing each of said entries in said order of priority until an entry is identified which supports at least one of the operating platform configuration and the associated locale.

4. The method of claim 1, wherein said utilizing step comprises the step of registering said desired font for use in the operating platform.

5. The method of claim 1, further comprising the steps of:
   retrieving a set of system fonts loaded in the operating platform;
   determining whether any of said system fonts supports a display of non-Latin text for the associated locale; and,
   utilizing a determined one of said system fonts in lieu of said desired font if said determined one of said system fonts is determined to support a display of non-Latin text for the associated locale.

6. A computer system configured for locale and operating platform independent font selection comprising:
   an operating platform executing in a computing system and having an operating platform configuration and an associated locale;
   a font properties file disposed in the computing system, the font properties file comprising a plurality of entries, each of said entries defining a font and at least one of corresponding supported locale and a corresponding supported operating platform configuration; and,
   a locale and operating platform independent font selection processor executing in the computing system and programmed first to parse the font properties file, to identify within the font properties file whether a desired font referenced in said font properties file supports at least one of the operating platform configuration and the associated locale, and to utilize the desired font in the operating platform if it is indicated within the font properties file that the desired font supports the at least one of the operating platform configuration and the associated locale.

7. The system of claim 6, wherein each of said entries defines a font and a corresponding supported locale for which said font can support a display of non-Latin text.

8. The system of claim 6, wherein said entries are sorted in order of priority for said defined fonts.

9. A computer program product stored on a computer memory adapted be executed by a machine to implement a method for locale and operating platform independent font selection for an operating platform, the computer program product comprising a routine set of instructions which when executed by a machine causes the machine to perform the steps of:
   parsing a pre-established font properties file comprising a listing of fonts and corresponding supported operating platform configurations for a particular locale;
   identifying within the font properties file whether a desired font referenced in said font properties file supports at least one of the operating platform configuration and the associated locale; and,
   utilizing said desired font in the operating platform if it is indicated within said font properties file that said desired font supports said at least one of the operating platform configuration and the associated locale.

10. The computer program product of claim 9, wherein said identifying step comprises the step of identifying within the font properties file whether a desired font referenced in said font properties file supports a display of non-Latin text for the associated locale.

11. The computer program product of claim 9, wherein the identifying step comprises the steps of:
   determining an order of priority for multiple entries in said font properties file for said desired font and,
   testing each of said entries in said order of priority until an entry is identified which supports at least one of said operating platform configuration and said associated locale.

12. The computer program product of claim 9, wherein said utilizing step comprises the step of registering said desired font for use in the operating platform.

13. The computer program product of claim 9, further comprising an additional set of instructions which when executed by the machine causes the machine to further perform the steps of:
   retrieving a set of system fonts loaded in the operating platform;
   determining whether any of said system fonts supports a display of non-Latin text for said associated locale; and,
   utilizing a determined one of said system fonts in lieu of said desired font if said determined one of said system fonts is determined to support a display of non-Latin text for said associated locale.

* * * * *